(12) United States Patent
Barnett, Jr.

(10) Patent No.: US 6,694,668 B2
(45) Date of Patent: Feb. 24, 2004

(54) APPARATUS FOR STORING FISHING LURES

(76) Inventor: Henry C. Barnett, Jr., 2649 Aimee Dr., Montgomery, AL (US) 36106

( * ) Notice: Subject to any disclaimer, the term of this patent is extended or adjusted under 35 U.S.C. 154(b) by 0 days.

(21) Appl. No.: 10/226,161

(22) Filed: Aug. 22, 2002

(65) Prior Publication Data

US 2002/0189152 A1 Dec. 19, 2002

Related U.S. Application Data

(63) Continuation-in-part of application No. 09/633,446, filed on Aug. 7, 2000, now abandoned.

(51) Int. Cl.$^7$ ............................................... A01K 97/06
(52) U.S. Cl. ......................................... 43/57.1; 43/57.2
(58) Field of Search ................................. 43/57.1, 57.2; 206/315.11; 242/395

(56) References Cited

U.S. PATENT DOCUMENTS

| | | |
|---|---|---|
| 2,412,332 A | 12/1946 | Hansen |
| 2,493,344 A | 1/1950 | Hamel |
| 2,763,957 A | 9/1956 | Roberts |
| 2,765,576 A | 10/1956 | Kurek |
| 3,033,487 A | 5/1962 | Walker |
| 3,039,226 A | 6/1962 | Bagdonas |
| 3,464,143 A | 9/1969 | Scott |
| 3,838,830 A | 10/1974 | Pettit |
| 4,006,554 A | 2/1977 | Tice et al. |
| 4,030,228 A | 6/1977 | Schaefers |
| 4,036,451 A | 7/1977 | Pipkin |
| 4,200,249 A | 4/1980 | Synstelien |
| 4,249,707 A | 2/1981 | Jones |
| 4,631,856 A | 12/1986 | Born |
| 4,681,220 A | 7/1987 | Beneke |
| 4,702,035 A | 10/1987 | Palm |
| 4,862,635 A | 9/1989 | Conte |
| 4,942,691 A | 7/1990 | Hwang |
| 5,544,442 A | 8/1996 | Perkins |
| 5,761,845 A | 6/1998 | Bartholomew |
| 5,857,285 A | 1/1999 | Little |

*Primary Examiner*—Kurt Rowan
(74) *Attorney, Agent, or Firm*—Bradley, Arant, Rose & White LLP

(57) ABSTRACT

A storage device for fishing lures comprising a rigid spool, having a hollow interior, and a hollow lure storage element extending across the hollow interior is described. The spool has an outer surface defining an annular channel comprising a floor and two side walls extending from said floor for receiving a leader line of a fishing lure. Each of the ends of the storage element intersect with the floor of the channel to define openings in the floor of the channel. In one embodiment, at least a portion of at least one of the openings is curved to reduce the possibility for "kinking" the leader line. At least one of said walls contains a plurality of slots that will receive the end of the leader line as will also be explained below. A small aperture located on the floor adjacent to at least one of the openings receives the lead hook of a fishing lure. A tab having a hole extends from the periphery of one of said walls to permit hanging of the device.

20 Claims, 3 Drawing Sheets

APPARATUS FOR STORING FISHING LURES

FIELD OF THE INVENTION

This is a continuation-in-part of application Ser. No. 09/633,446, filed Aug. 7, 2000, now abandoned.

This invention relates to devices for organizing and storing fishing lures.

BACKGROUND OF THE INVENTION

Washington Irving once wrote, "There is certainly something in angling that tends to produce a gentleness of spirit, and a pure serenity of mind." No doubt, Mr. Irving had in mind the peaceful moments of the sport of fishing when an individual has his pole in hand and line and lure in the water. Nothing in life is ever quite that easy or that perfect. Fishing is no different. As the best anglers in the business are well aware, frustrations abound along the way to landing the big one. Not least of these is the often tedious task of sorting out the hooks, lures, weights, leaders and other devices fishermen must assemble before making that first cast. How many times has an angler, having glimpsed a large dorsal fin within striking distance, missed out on the opportunity to add to his trophy case because of an inability to equip his line in a timely manner? The instant device gives every angler hope that this nightmare will not repeat itself.

Fishing lures do not lend themselves to convenient and efficient storage, especially when the lures are rigged with wire or monofilament leader (as is usually the case). As even the average angler well knows, keeping more than just a few lures in the same compartment of a tackle box is a difficult proposition. The hooks of one lure often become entangled with the hooks of one or more other lures. The leader lines, which are often several feet in length, frequently become entangled. To avoid such entanglements, anglers often remove the leader line and store it separately, but this takes away from the time that could otherwise be used fishing. It also requires additional storage space.

Furthermore, the odd shapes and sizes of the near-infinite variety of lures makes storage difficult. Many lures have delicate features such as feathers or other "skirt" materials that can be easily damaged by entanglements and improper storage. Even the largest, most expensive tackle boxes do not have enough compartments of various shapes and sizes to store efficiently the multiple lures that fishermen often possess.

The general object of the invention is to permit fishing lures of variable shapes and sizes to be efficiently stored, transported and handled. Utilization of the instant device eliminates entanglements of the lures and leader lines that can hinder the fishing experience and sometimes result in damage to the lure itself. Proper use of the invention will protect and extend the useful life of fishing lures which can often be expensive. It is a further object of this invention to provide a device that is affordable to manufacture and purchase.

SUMMARY OF THE INVENTION

These and other objects and advantages are obtained in a device and method for storing fishing lures. The invention is a storage device comprised of a rigid spool, having a hollow interior. The annular outer surface of said spool is generally concave and defines an annular channel for receiving the leader line as will be described below. Said channel is comprised of a floor and two side walls that extend from said floor. At least one of said walls contains a plurality of slots that will receive the end of the leader line as will also be explained below. A tab having a hole extends from the periphery of one of said walls to permit hanging of the device.

In the preferred embodiment, the spool is generally cylindrical, although it is anticipated that other shapes could be employed. The inner diameter of the spool will vary and depend primarily on the size of the lure to be stored therein.

A hollow lure storage element extends across the hollow interior of the spool. Each of the ends of said storage element intersect with the floor of the channel to define openings in the floor of the channel. In one embodiment, at least a portion of at least one of the openings is curved, as is described in more detail below. It will be appreciated that the curved opening reduces the possibility for "kinking" the leader line that otherwise might result from winding the leader line around the channel if the curved opening was not present.

In one embodiment, the storage element has a generally circular cross-section. However, it is anticipated that alternate configurations of the storage element may be employed. For example, the storage element may have a generally square cross-section, a generally oval cross-section, a generally triangular cross-section, or a generally hexagonal cross-section. A small aperture is located in the floor of the channel adjacent to the openings. Said aperture receives the tip of the trailing hook of the fishing lure so that it can be secured in place and reduce the possibility of snaring other objects. The storage element should be made of firm but flexible material to allow for a secure fit around the lure without causing damage to the lure. It is further anticipated that the material used to make the storage element should be non-opaque to permit the lure stored therein to be viewed. Clear plastic is one example of a material that could be used to make the storage element.

The present invention enables the user to store, transport and access numerous pre-rigged artificial lures without the usual frustrations of entanglement and premature wear and tear on the lures and leader lines. In addition, the present invention is affordable to manufacture.

BRIEF DESCRIPTION OF THE DRAWINGS

These and other objects of the present invention, as well as its advantages and capabilities, will be more fully understood by reference to the following detailed description when considered in connection with the accompanying drawings in which:

FIG. 1 is a three-dimensional view of one embodiment of the present invention with sample fishing lure before being loaded in the invention.

FIG. 2 is a cross-sectional, side view of one embodiment of the present invention with sample fishing lure stored in place.

FIG. 3A is a top view of one embodiment of the present invention.

FIG. 3B is a top view of an alternate embodiment of the present invention.

FIGS. 4A–C are three-dimensional views of the alternate embodiment of the present invention illustrated in FIG. 3B illustrating different cross sectional geometries of the storage element, with FIG. 4A showing a generally circular cross section, FIG. 4B showing a generally oval cross section and FIG. 4C showing a generally square cross section.

DETAILED DESCRIPTION OF THE INVENTION

Figure 1:
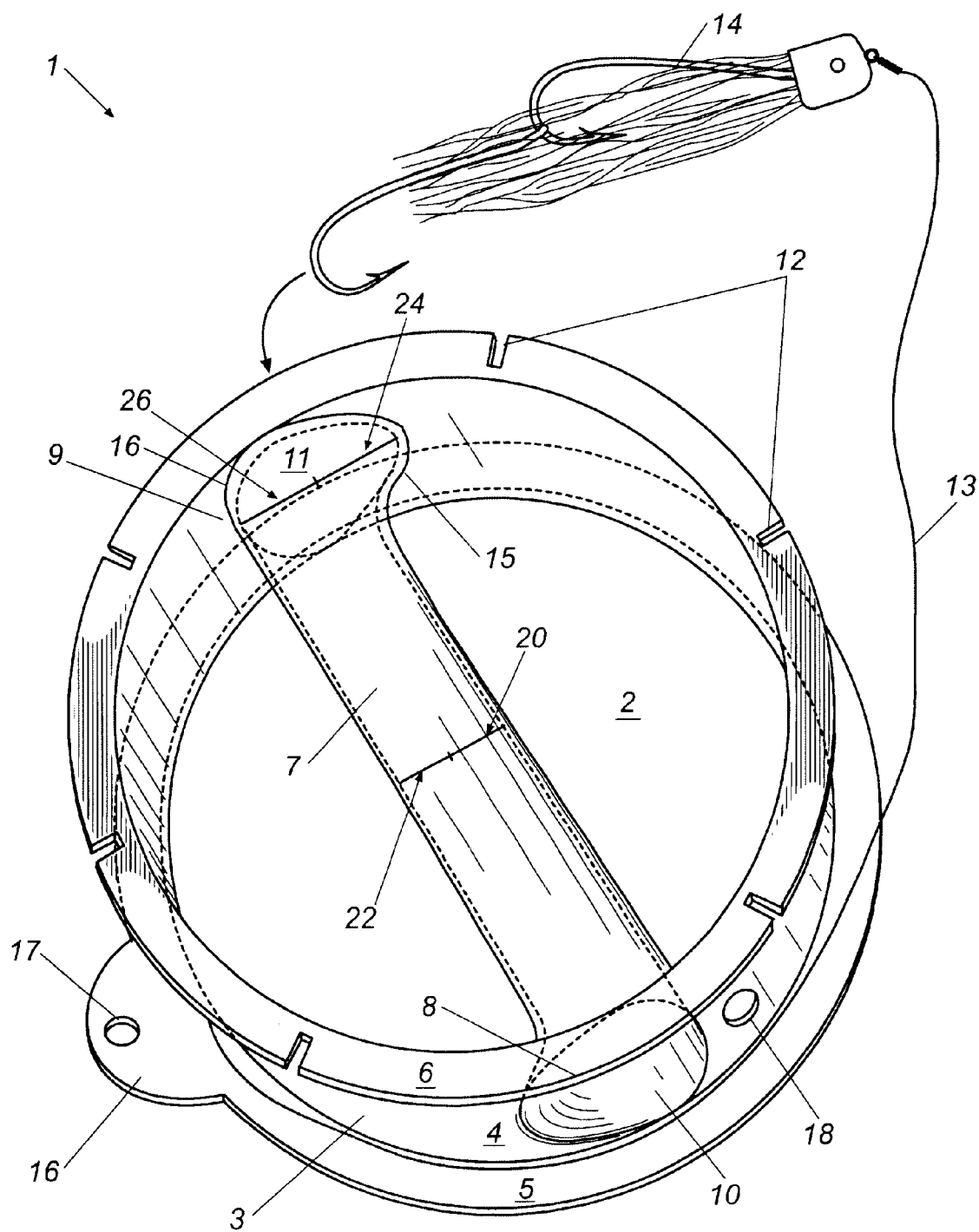
Figure 2:
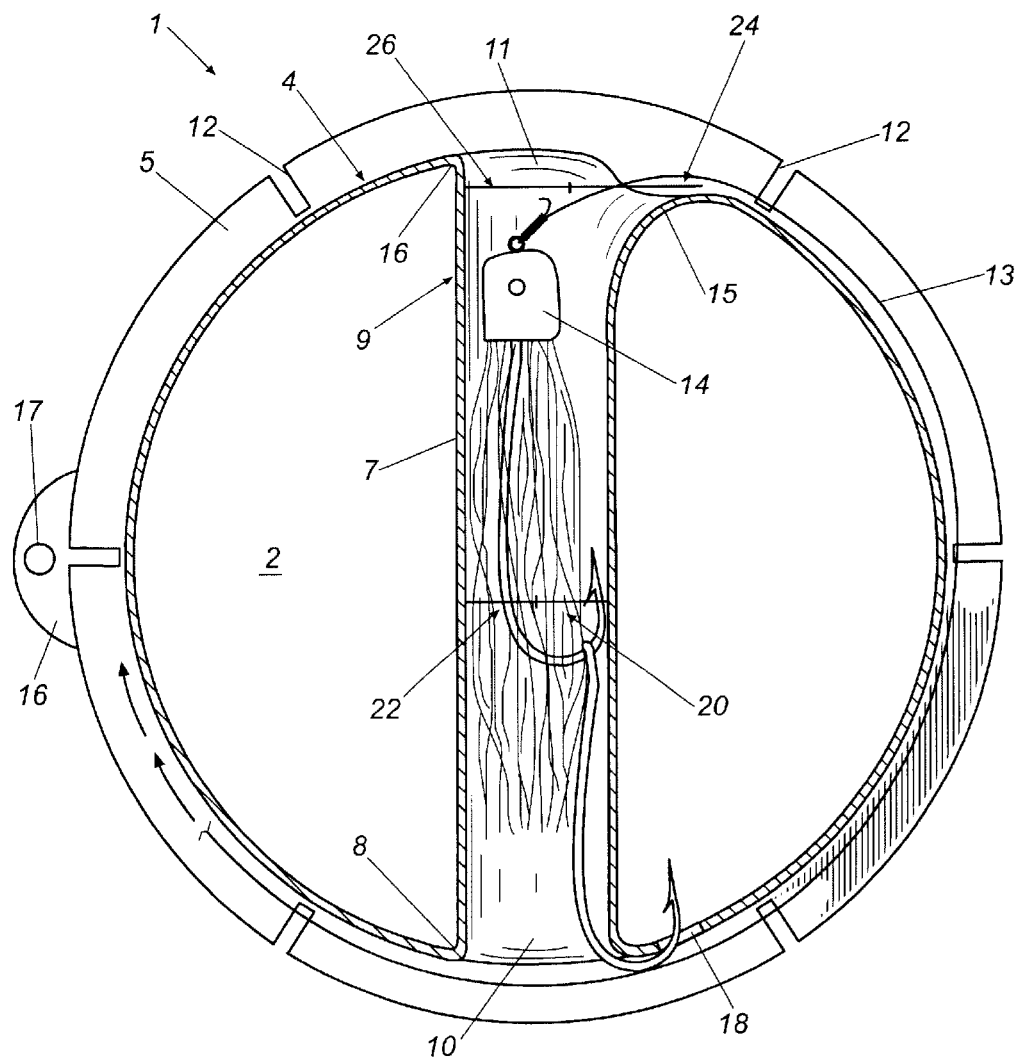

Referring to FIGS. 1 and 2, the apparatus for storing fishing lures is illustrated. The apparatus comprises a rigid spool 1 having a hollow interior 2 and an annular, external channel 3. Said channel 3 is comprised of a floor 4, and two outer walls, 5 and 6, extending from said floor 4. As will be described more fully below, said channel 3 provides the means by which the leader line of a fishing lure can be wound in place.

Figure 3A:
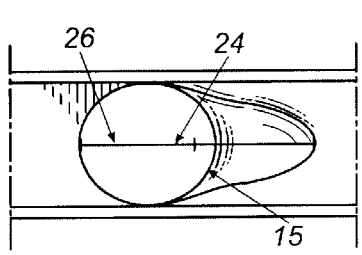

A hollow lure storage element 7 extends across said interior 2 of said rigid spool 1. The storage element 7 may be comprised of a flexible non-opaque material as discussed above. The storage element 7 has a first end 8, a second end 9, a first midpoint radius 20 and a second midpoint radius 22. The first and second ends, 8 and 9 respectfully, intersect with the floor 4 of the channel 3 to define openings, 10 and 11, in the floor 4 of the channel 3. Each opening 10 and 11 has a first opening radius 24 and a second opening radius 26. At least one of the opening 10 and the opening 11 has a first opening radius that is greater than the first midpoint radius of the storage element. In one embodiment shown in FIGS. 1 and 2, and more clearly shown in FIG. 3A, at least one end (illustrated in this embodiment as end 9) of the storage element 7 intersects the floor 4 of channel 3 to define an opening (illustrated in this embodiment as opening 11) such that the first opening radius 24 is greater than the first midpoint radius 20. As a result of the differences in radii 20 and 24, a portion of the opening (illustrated in this embodiment as opening 11) intersects the floor 4 of channel 3 in a curved, or sloped, manner indicated at 15. As illustrated in FIGS. 1, 2 and 3A, the second opening radius 26 is substantially equal to the second midpoint radius 22, such that a portion of the end (illustrated in this embodiment as end 9) intersects the floor 4 of channel 3 in a non-curved manner, indicated at 16.

Figure 3B:
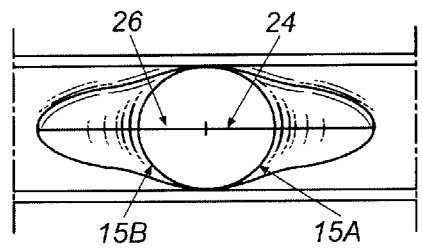
Figure 4A:
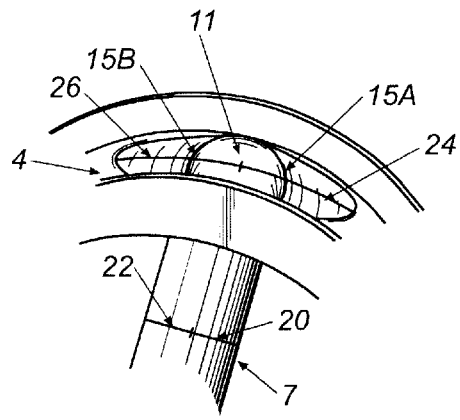

In an alternate embodiment illustrated in FIGS. 3B and 4, at least one end (in this embodiment illustrated as end 9) of the storage element 7 intersects the floor 4 of channel 3 to define an opening (illustrated in this embodiment as opening 11) such that the first opening radius 24 is greater than the first midpoint radius 20 and the second opening radius 26 is greater than the second midpoint radius 22. As a result of the difference in radii 20 and 24, and 22 and 26, two portions of the opening (illustrated in this embodiment as opening 11) intersect the floor 4 of channel 3 in a curved, or sloped, manner indicated at 15A and 15B.

The amount of curvature, or slope, introduced can be varied by varying the difference in the first midpoint radius 20 and the first opening radius 24, and/or the difference in the second midpoint radius 22 and the second opening radius 26. The amount of curvature is sufficient to reduce the kinking of the lead line. Such determination is well within the ordinary skill in the art.

Although not illustrated for clarity of the drawings and specification, it is considered within the scope of the disclosure if both ends 8 and 9 intersect with the floor 4 of channel 3 to define openings 10 and 11 in a sloped or curved manner as described above for end 9 and opening 11.

Figure 4B:
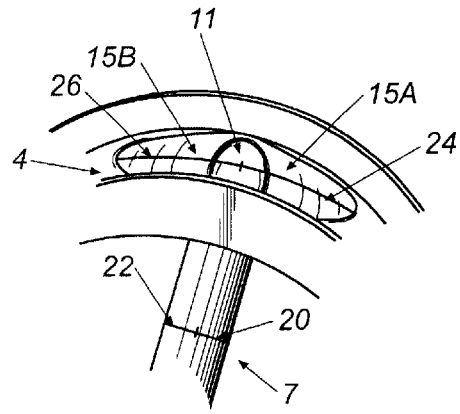
Figure 4C:
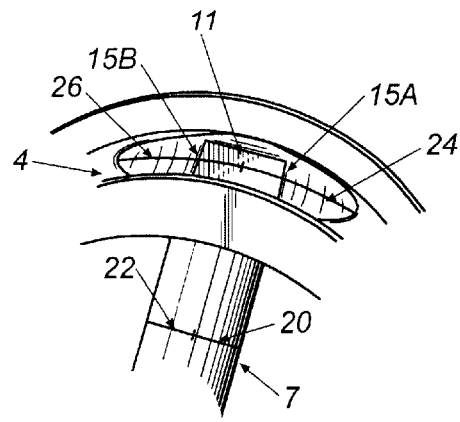

In one embodiment, the storage element 7 has a generally circular cross-section (illustrated in FIGS. 1–3 and 4A). However, it is anticipated that alternate configurations of the storage element 7 may be employed (FIGS. 4B and 4C). For example, the configuration of the storage element 7 may have a generally square cross-section (FIG. 4C), a generally oval cross-section (FIG. 4B), a generally triangular cross-section, or a generally hexagonal cross-section. The exact configuration of the cross section will be, in part, determined by the design and type of lure 14 to be stored in storage element 7, and alternate configurations of the storage tube 7 are intended to be covered by the scope of the disclosure. The midpoint radii 20 and 22 may also be increased or decreased as dictated by the design and type of lure 14. The storage element 7 should be designed to allow for a secure fit around lure 14 without damaging lure 14. Therefore, it is considered within the scope of this disclosure that the configuration of the storage element 7 may have any cross-sectional shape and radius convenient for the storage of lures 14. The determination of such configurations is within the ordinary skill of the art in the field.

An aperture 18 is located in said floor 4 of said channel 3, adjacent to at least one of said openings 10 and 11. Said aperture 18 is sized for receiving the tip of the trailing hook 15 of the fishing lure 14 so that it can be secured in place and reduce the possibility of snaring other objects. At least one of said outer walls contains a plurality of narrow slots 12, said slots having an appropriate width to allow the end of said leader line 13 to be forcibly secured there through. A tab 16 having a hole 17 extends from the periphery of one of said walls to permit hanging of the device.

Comparing FIGS. 1 and 2, the manner in which a fishing lure 14 is stored using the present invention will now be described. The unattached end of leader line 13 is threaded through storage element 7. The leader is pulled through the storage element 7 until the body of fishing lure 14 is encased in the storage element 7 and the tip of trailing hook 15 of lure 14 is in position to be secured in aperture 18. Leader line 13 is then wrapped around channel 3 of spool 1. The unattached end of leader line 13 is secured in one of the plurality of slots 12 located in one of outer walls of channel 3. It will be appreciated that, so positioned, lure 14 is protected by storage element 7, and the hooks and leader line of lure 14 are restrained from becoming entangled with each other or with other lures.

What is claimed is:

1. An apparatus for storing fishing lures, said apparatus comprising:
   (a) a spool having a hollow interior and an annular, external channel, said channel having a floor and two outer walls extending from said floor;
   (b) a hollow storage element extending across said hollow interior of said spool, said storage element having a first end, a second end, a first midpoint radius and a second midpoint radius
   (c) said first and second ends intersecting with said floor of said channel and defining a first and a second opening within said floor of said channel, said first and second openings each having a first opening radius and a second opening radius; and
   (d) said first opening radius of at least one of said first and second openings being greater than said first midpoint radius of said storage element such that at least a portion of said first or second openings intersects said floor of said channel in a curved manner.

2. The apparatus of claim 1 having a plurality of slots within said walls of said channel.

3. The apparatus of claim 1 wherein at least one aperture is located in said floor adjacent to at least one of said openings of said floor.

4. The apparatus of claim 1 wherein at least one of said walls contains a plurality of slots, said slots having an appropriate width for permitting the securement of leader line of a fishing lure.

5. The apparatus of claim 1 wherein said spool is made of rigid material.

6. The apparatus of claim 1 wherein said storage element is comprised of flexible, non-opaque material.

7. The apparatus of claim 1 further comprising a tab extending radially from the periphery of one of said walls, said tab having a hole.

8. The apparatus of claim 1 where said storage element has a generally circular cross-section.

9. The apparatus of claim 1 where said storage element has a generally oval cross-section.

10. The apparatus of claim 1 where said storage element has a generally square cross-section.

11. The apparatus of claim 1 where said first opening radius of at least one of said first and second openings is greater than the first midpoint radius of said storage element, and said second opening radius of at least one of said first and second openings is greater than said second midpoint radius of said storage element such that at least a portion of said first or second openings intersects said floor of said channel in a curved manner.

12. The apparatus of claim 8 having a plurality of slots within said walls of said channel.

13. The apparatus of claim 8 wherein at least one aperture is located in said floor adjacent to at least one of said openings of said floor.

14. The apparatus of claim 8 wherein at least one of said walls contains a plurality of slots, said slots having an appropriate width for permitting the securement of leader line of a fishing lure.

15. The apparatus of claim 8 wherein said spool is made of rigid material.

16. The apparatus of claim 8 wherein said storage element is comprised of flexible, non-opaque material.

17. The apparatus of claim 8 further comprising a tab extending radially from the periphery of one of said walls, said tab having a hole.

18. The apparatus of claim 8 where said storage element has a generally circular cross-section.

19. The apparatus of claim 8 where said storage element has a generally oval cross-section.

20. The apparatus of claim 8 where said storage element has a generally square cross-section.

\* \* \* \* \*